April 3, 1962      H. HUBBELL      3,028,467
SEALING COVER PLATE FOR TOGGLE SWITCHES
Filed May 25, 1959      2 Sheets-Sheet 1
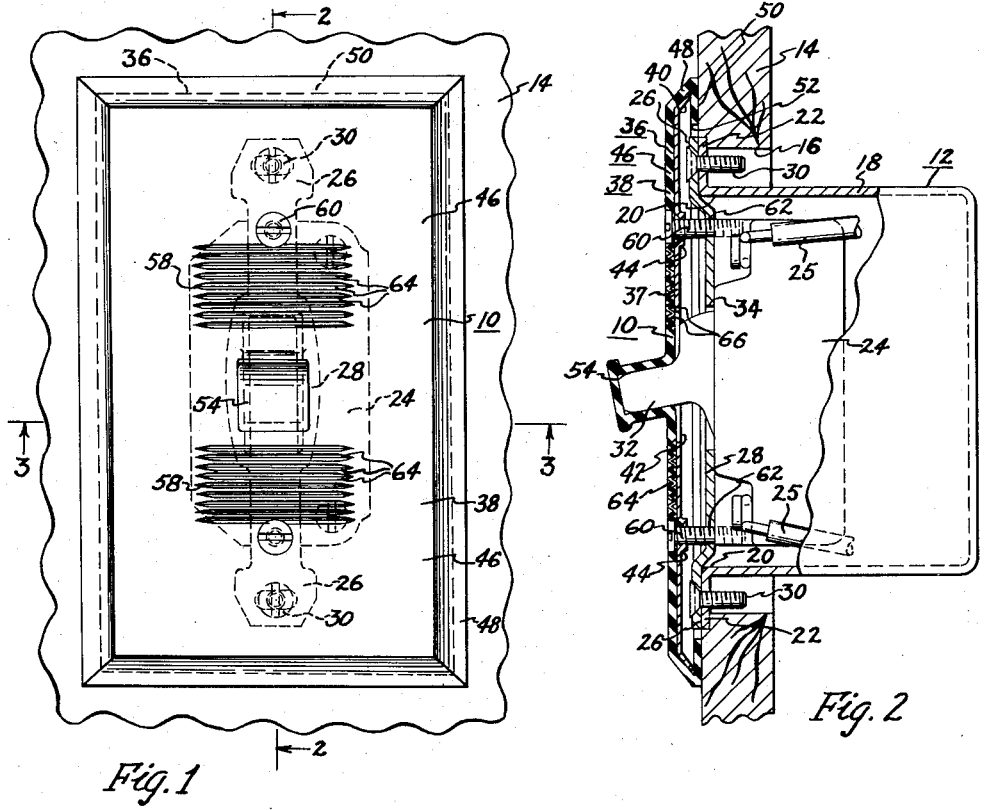
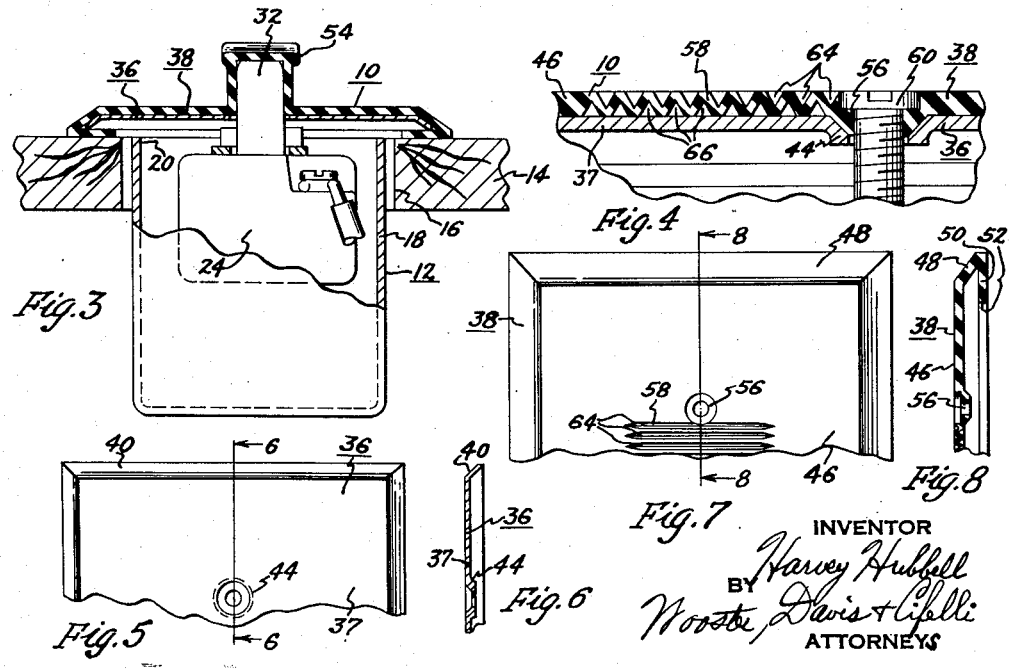
INVENTOR
Harvey Hubbell
BY
Wooster, Davis & Cifelli
ATTORNEYS

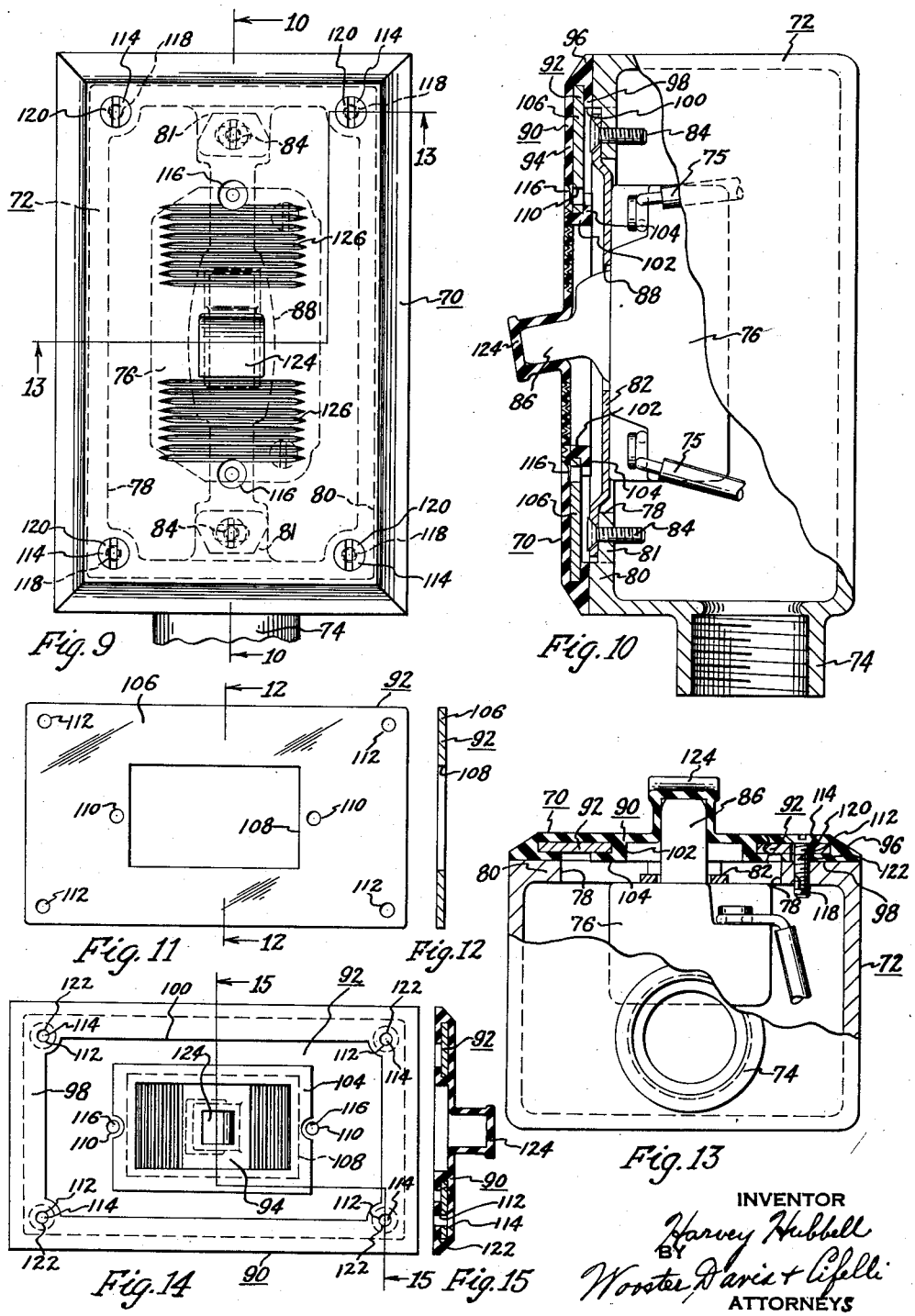

United States Patent Office 3,028,467
Patented Apr. 3, 1962

3,028,467
SEALING COVER PLATE FOR TOGGLE SWITCHES
Harvey Hubbell, Southport, Conn., assignor to Harvey Hubbell, Incorporated, Bridgeport, Conn., a corporation of Connecticut
Filed May 25, 1959, Ser. No. 815,623
12 Claims. (Cl. 200—168)

This invention relates to cover plates for electrical toggle switch boxes, and particularly to sealing cover plates.

In many practical applications of electrical toggle switch boxes, such as when used in trailers, boat yards, and industrial situations, it is important to prevent the entrance of moisture, dust, metal filings and the like into the interior of the switch box. The art has proposed various arrangements for connecting and sealing cover plates to electrical switch boxes. However, such arrangements have not been entirely satisfactory. When sealing gaskets are employed between the cover plate and the electric switch box, they are subject to malfunctioning as a result of improper mounting, and it is necessary to provide supplemental sealing means for sealing the switch operating means. When cover plates having resilient sealing covers are utilized, they are subject to material fatigue and consequential failure and destruction of their sealing capacity, as a result of the frequent flexing of certain portions of the cover which accompanies the necessary stressing of the cover when force is transmitted through the cover to the switch operating means to activate the latter to operate the switch.

It is an object of the invention to provide an improved sealing cover plate for an electrical toggle switch box, which covers and seals the usual opening in the switch box and prevents the entrance of moisture, dust, metal filings and the like into the interior of the switch box.

It is another object of the invention to provide such an improved switch box sealing cover plate, which includes a sealing cover that has a flexible portion which permits force to be transmitted through the cover to the switch operating means without significantly stretching the material of which the cover is made, thereby avoiding failure of the cover.

The objects of the invention are achieved in one form by providing a sealing cover plate for an electrical toggle switch box, the cover plate having a portion for transmitting force to the toggle switch operating means of a switch mounted within the switch box, and at least one flexible portion adjacent to the first portion which is capable of elongating without significantly stretching the material of which it is made.

The above and other objects of my invention and further details of that which I believe to be novel and my invention will be clear from the following description and claims taken with the accompanying drawings, wherein:

FIG. 1 is a front elevational view of a wall-mounted electrical switch box assembly having a sealing switch cover plate which incorporates the instant invention;

FIG. 2 is a partial side elevational view with portions broken away, and a partial sectional view taken substantially on line 2—2 of FIG. 1;

FIG. 3 is a partial bottom plan view with portions broken away, and a partial sectional view taken substantially on line 3—3 of FIG. 1;

FIG. 4 is an enlarged view of a portion of FIG. 2;

FIG. 5 is a fragmentary front elevational view of the rigid plate of the cover plate;

FIG. 6 is a sectional view taken substantially on line 6—6 of FIG. 5;

FIG. 7 is a fragmentary front elevational view of the sealing cover of the cover plate;

FIG. 8 is a sectional view taken substantially on line 8—8 of FIG. 7;

FIG. 9 is a front elevational view of a modification of the invention;

FIG. 10 is a partial side elevational view with portions broken away, and a partial sectional view taken substantially on line 10—10 of FIG. 9;

FIG. 11 is a front elevational view of the rigid plate which is embedded in the cover plate of the FIG. 9 modification;

FIG. 12 is a sectional view taken substantially on line 12—12 of FIG. 11;

FIG. 13 is a partial bottom plan view with portions broken away, and a partial sectional view taken substantially on line 13—13 of FIG. 9;

FIG. 14 is a rear elevational view of the cover plate of the FIG. 9 modification, and FIG. 15 is a sectional view taken substantially on line 15—15 of FIG. 14.

In the drawings there are illustrated two modifications of the invention. One modification of the invention is illustrated in FIGS. 1-8, and is shown as comprising one form of cover plate that is associated with a wall-mounted electrical switch box. The other modification of the invention is illustrated in FIGS. 9-15, and is shown as comprising another form of cover plate that is associated with a conduit mounted electrical switch box. It will be understood by those skilled in the art that with slight alteration to accommodate them to the type of electrical switch box with which they are used, both forms of cover plate may be used with other types of switch boxes.

In FIGS. 1-8, one form of the invention is illustrated as generally comprising an improved sealing cover plate 10 which is associated with an electrical switch box 12 of the known wall-mounted type, which is rigidly secured to the wall 14 and extends through an opening 16 formed therein. The means for rigidly securing the switch box 12 to the wall 14 may be of any known type and is not illustrated.

The switch box 12 generally comprises a box-like portion 18 for housing an electrical switch, which has a front opening 20 and a pair of mounting tabs 22 formed at its front adjacent said opening. An electrical switch 24, which may be of any known toggling type, but which is illustrated throughout the drawings as being a conventional manually operated, toggle switch, is mounted in the box-like portion 18 as by having the mounting ears 26 of its yoke 28 rigidly secured to the mounting tabs 22 on the box-like portion 18 by the screws 30, which are received in appropriate aligned openings formed in said mounting ears and said mounting tabs. Switch 24 has conventional electrical conductor wires 25 secured to it in a known manner and includes switch operating means in the form of a finger-operated, snap-acting, pivoted, toggling member 32 which is disposed at the front of the switch box 12 and projects through and beyond the opening 34 formed in the yoke 28, and the opening 20 formed in the switch box. As can be clearly seen in FIG. 2, the toggle member 32 projects substantially beyond the wall 14 on the room side thereof.

The switch box 12, its associated parts including the switch 24, and the opening 16 in the wall 14, are covered and sealed by the cover plate 10 from the room side of the wall. The cover plate 10 functions to both provide a closure for the switch box 12, which may be decorative, and to seal the front of the switch box from the entrance of moisture, dust, metal filings and the like. It will be observed from FIG. 3, that some space exists between the wall opening 16 and the front portion of the box-like portion 18 that surrounds opening 20, and that it is possible for foreign matter to enter into the switch box through this space from the rear side of the wall 14. However, it will be understood by those skilled in the art that it is not likely that there be such foreign matter on the rear side of wall 14, but that in any event this space may be appropriately sealed readily in any desirable manner to prevent the entry of such foreign matter, if desired.

Cover plate 10 comprises two principal parts, the rigid plate 36 and the sealing cover 38. The rigid plate 36, as illustrated, is a conventional wall switch box face plate, which may be made of a suitable metal, such as steel, and has a generally planar portion 37 having a rearwardly extending peripheral portion 40, a central rectangular opening 42 through which the toggle member 32 may extend, and a pair of mounting openings 44 formed by offset tapered tubular portions of portion 37. The sealing cover 38 is made of a resilient material, such as natural or synthetic rubber or an equivalent material, and is configured and dimensioned so as to snugly cover the rigid plate 36. The sealing cover 38 comprises a generally planar front portion 46 having a rearwardly extending peripheral portion 48 which terminates in a flat inwardly directed sealing flange 50 which defines a central generally rectangular opening 52 on the rear side of the sealing cover 38. Sealing cover portion 46 includes a central hollow protuberance 54 which projects at the front thereof, a pair of spaced mounting openings 56 which are formed by offset portions of portion 46, and a pair of flexible portions 58, the construction and operation of which will be described in greater detail subsequently.

When the cover plate 10 is fully assembled, the sealing cover 38 snugly embraces the rigid plate 36 and covers it completely on its front side and around its periphery, in the manner illustrated in the drawings. The cover plate 10 is mounted on the switch box 12 by the securing screws 60 which pass through the openings 56 in the sealing cover 38 and the openings 44 in the rigid plate 36 and are threadedly received in the openings 62 formed in the switch yoke 28. The structural relationship of the offset portions of the sealing cover which form openings 56, the portions of the rigid plate which form openings 44 and the screws 60 is such as to seal these openings when the cover plate 10 is fully mounted on the switch box. When the cover plate is fully mounted, the sealing cover protuberance 54 surrounds the switch toggle member 32, and the sealing cover flange 50 is biased into tight sealing engagement with the portion of wall 14 that surrounds the wall opening 16, all of which functions to prevent the entrance of moisture, dust and metal filings and the like from the front of the wall 14 into the switch box 12. It will, therefore, be apparent that the rigid plate 36 reinforces and stiffens the cover plate 10 to provide structural strength, and that the sealing cover 38 effectively seals the cover plate, and yet, permits actuation of the switch-operating toggle member 32, as will now be explained in greater detail.

As was pointed out above, toggle member 32 extends through yoke opening 34, the switch box opening 20, the opening 42 formed in the rigid plate 36 and into the hollow portion of the protuberance 54. Because the sealing cover is made of a resilient material, the toggle member 32 is capable of being actuated by a force which is exerted on the protuberance 54 and transmitted through the sealing cover to the toggle member. In the absence of flexible portions 58, such actuation of the toggle member 32 would be permitted because of the inherent resilience of the sealing cover 38. However, such actuation, which in normal use occurs frequently, would cause considerable stretching of the sealing cover 38, particularly in the areas above and below the protuberance 54, as viewed in FIGS. 1 and 2, for it is in these areas that stretching to allow shifting of the protuberance and actuation of the toggle member 32, is most likely to take place. Such frequent stretching has an adverse effect on these areas of the sealing cover, and ultimately results in material fatigue and failure of the sealing cover, as by cracking or splitting in these areas. Such failure, of course, destroys the sealing capacity of the sealing cover and renders it useless. The foregoing was the prior art setting for my invention, which although permitting all of the operational advantages of prior art sealing cover plates, eliminates the problem of sealing cover failure which results from stretching of the sealing cover when the switch operating means is actuated by shifting the sealing cover protuberance.

The elimination of the foregoing problem is effected by providing at least one, and in the preferred form, two, flexible portions 58. In the preferred form the two portions 58 are spaced on the sealing cover 38 and straddle the protuberance 54. As can best be seen in FIG. 1, each of the flexible portions 58 comprises a plurality of spaced, transverse straight grooves 64 which are formed in the front side of sealing cover portion 46. As can most clearly be seen in FIG. 4, the flexible portions 58 are corrugated in cross section. This obtains because each of the flexible portions 58 also includes a plurality of spaced transverse straight grooves 66 which are formed on the rear side of the sealing cover portion 46. It will be observed in FIG. 4 that the grooves 64 and 66 are V-shaped in cross section and are alternately disposed to form a zig-zag wall portion which is similar to that of the cross section of a bellows wall, and which herein is referred to as being "corrugated." Each of the flexible portions 58 operates in a unique manner to permit elongation in a direction normal to the grooves (in FIG. 1 in a vertical direction) without significantly stretching the material of which it is made. This results from the unique action of the corrugated wall portion when it is subjected to longitudinal elongating forces. This unique action, which is herein referred to as "bellows action," comprises bending of the apex portions, when elongation occurs, of each corrugation so as to permit the legs thereof to separate, and should be clearly differentiated from normal stretching which a resilient element is capable of. The cumulative effect of the bellows action is to permit elongation of the flexible portions 58 without any significant stretching of the material of which they are made. As will be understood by those skilled in the art, the elimination of significant stretching eliminates the principal cause of sealing cover failure in prior art constructions, which required stretching of their sealing covers to permit actuation of the switch operating means.

Elongation of the flexible portions 58 without stretching occurs each time the toggle member 32 is actuated by a force applied to shift the protuberance 54. It has been found in practice that with the sealing cover plate construction illustrated in FIGS. 1–8, the useful life of the cover plate is substantially increased over prior art constructions. Such increase in life is attributable in large measure to the construction and operation of the flexible portions 58. It should be noted that the preferred form of the illustrated form of the first modification includes a pair of flexible portions 58, one on each side of the protuberance 54. However, if desired, particularly when applied to a toggle switch assembly wherein the protuberance 54 is formed to slightly incline when the cover plate is in a free state, only one flexible portion 58 may be utilized, and it should be disposed on the side of the protuberance toward which the latter inclines.

The second modification of the invention is illustrated in FIGS. 9 to 15. This modification includes an alternative cover plate 70, which is illustrated as being associated with a conduit mounted electrical switch box 72 which may be freely disposed when finally mounted, as by being located adjacent to a control station or an electrical device which it controls. The switch box 72 may be made of a rigid material, such as a metal, and includes an innally threaded collar 74 for mounting the switch box on a conduit and for permitting an electrical cable to enter into the interior of the switch box 72 and have its electrical conductor wires 75 connected to the switch 76, which is supported in the switch box, in the usual manner. The switch box 72 has an opening 78 formed in its front wall 80, and the latter has mounting tabs 81 to which the switch mounting yoke 82 may be connected by any suitable means, such as the screws 84. As can best be seen in FIG. 10, the switch 78 is of the toggling type and includes switch operating means in the form of a toggle member 86 which projects forwardly through the yoke opening 88 and the opening 78 in the front wall of the switch box.

The cover plate 70 is adapted to close and tightly seal the opening 78 in the switch box against the entrance of moisture, dust, metal filings and the like, and yet permit actuation of the toggle member 86 from the exterior of the switch box. The cover plate generally comprises two parts, a sealing cover 90 and a rigid plate 92.

The sealing cover 90 is made of a resilient material, such as natural or synthetic rubber, or an equivalent material, and includes a generally planar front portion 94 having a rearwardly extending peripheral portion 96 which terminates in a flat inwardly directed sealing flange 98 which defines a central generally rectangular opening 100 on the rear side of the sealing cover 90. Centrally of and spaced within the portion 96, and extending rearwardly from the planar portion 94, is a generally rectangular flange-like wall 102 which terminates in an outwardly directed generally rectangular flange 104 which is generally co-planar with and spaced within flange 98. The planar portion 94 of the sealing cover 90 is substantially reinforced and stiffened by the rigid plate 92 which is embedded in the sealing cover 90.

The rigid plate 92 may be made of a suitable metal, such as steel, and may be embedded in the sealing cover 90 by any convenient method, as by having the latter molded about it. The detailed construction of the rigid plate 92 may be seen in FIGS. 11 and 12, wherein it will be observed that it includes a generally rectangular planar portion 106 that is smaller than the sealing cover 90 and includes a central rectangular opening 108, two spaced openings 110, and four spaced corner openings 112.

When the cover plate 70 is completely constructed, the rigid plate 92 is covered completely on its front side, its edges, outer peripheral portions of its rear side, and portions of its rear side which surround the opening 108, by the sealing cover 90. The sealing cover 90 has a set of four mounting portions 114 formed near its corners so as to be in registry with the openings 112 in the rigid plate 92, and a set of two mounting portions 116 which are disposed to be in registry with the openings 110 in the rigid plate 92, when the cover plate is completely constructed. It should be understood that the portions 114 and 116 are not openings, but that they are solid walls that are adapted to be pierced by mounting screws when the cover plate is mounted on the switch box 72. Only one set of mounting portions is pierced and used, depending upon the disposition of the mounting openings in the switch box. In the illustrated switch box, four corner openings 118 (see FIGS. 9 and 13) are formed, and therefore four corner screws 120 are used to mount the cover plate 70 on the switch box 72. This being the case, only the set of mounting portions 114 of the sealing cover 90 are pierced by the screws 120, which pass therethrough and through the openings 112 formed in the rigid plate 92 and the openings 122 formed in the sealing flange 98 of the sealing cover. Therefore, the set of mounting portions 116 are not pierced. If, on the other hand, a switch box having two spaced central mounting screw receiving openings were employed, the set of mounting portions 116 would be pierced and utilized for the mounting screws, and the set of mounting portions 114 would be left intact.

Centrally of the sealing cover planar portion 94, a central hollow protuberance 124 is provided which projects from the front thereof. The protuberance 124 opens on its rear side and communicates with the opening 108 in the rigid plate 92. When the cover plate 70 is mounted on the switch box 72, the toggle member 86 extends into the protuberance 124 and may be acted manually in the same manner as the switch toggle member 32 of the first modification.

In order to provide for increased life of the cover plate, flexible portions 126 are provided in the sealing cover 90 on opposite sides of the protuberance 124. The flexible portions 126 are constructed and operate in generally the same manner as the flexible portions 58 of the sealing cover of the first modification, and the explanation pertaining thereto and the advantages possessed thereby, which are set forth above, equally apply to the flexible portions 126 and will not be repeated here.

In view of the foregoing, it will be apparent that preferred forms of two modifications of the invention have been disclosed, and that, in general, both modifications operate in the same manner and include cover plates having a resilient sealing cover which includes unique flexible portions which permit elongation, when the toggling switch operating means is actuated, without significantly stretching the resilient material of which they are made. Therefore, in both modifications, the life of the sealing cover plates is materially increased, and the objects of this invention have been achieved.

As will be evident from the foregoing description, certain aspects of my invention are not limited to the particular details of construction of the example illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. In combination: a switch box having an open front side; an electrical toggle switch mounted in said box; a shiftable toggling switch operating member disposed at the front of and projecting beyond the open front side of said box; and a sealing cover plate disposed on the exterior of said box and covering and sealing the open front side of said box; said sealing cover plate being substantially planar except for a projecting hollow finger grip portion which is mounted over said operating member and is selectively operable by manual pressure to toggle said operating member to operate said switch; said sealing cover plate including flexible means which is capable of elongating without significant stretching of its material when said finger grip portion is subjected to pressure and said operating member is toggled; said flexible means comprising a thin corrugated wall portion of said sealing cover plate that is formed adjacent one side of said finger grip portion toward which said operating member is arranged to be toggled by a plurality of spaced parallel straight grooves which are formed in each side of said sealing cover plate, whereby said flexible means does not project beyond said sealing cover plate and on elongation of said flexible means said thin corrugated wall portion acts as a cross section of a bellows and thereby permits such elongation without any significant stretching of said material.

2. The combination defined in claim 1 wherein said flexible means comprises a second thin corrugated wall portion similar to said thin corrugated wall portion which is disposed adjacent the opposite side of said finger grip portion.

3. The combination defined in claim 1 wherein said cover plate comprises a rigid substantially planar plate which is substantially covered and closely embraced by a resilient substantially planar sealing cover, said finger grip portion and said flexible means are formed integrally with said cover, and said rigid plate has a central opening in registry with said finger grip portion through which said operating member extends.

4. The combination defined in claim 3 wherein pierceable portions are provided in said cover for permitting passage of cover plate mounting means through said cover.

5. The combination defined in claim 3 wherein said switch box is mounted in a wall, said rigid plate is a conventional switch box face plate, said cover is removable from said rigid plate and means is provided for mounting said cover plate in sealed relationship with said switch box.

6. The combination defined in claim 5 wherein said rigid plate has a plurality of openings for the reception of cover plate mounting means, and said cover includes pierceable portions that are aligned with said openings.

7. The combination defined in claim 3 wherein said rigid plate is embedded in said cover.

8. The combination defined in claim 7 wherein said rigid plate includes a plurality of openings for the reception of cover plate mounting means, and said cover includes pierceable portions that are aligned with said openings.

9. A cover plate for the open side of an electrical toggle switch wall box comprising: a conventional generally planar switch box face plate; a generally planar cover of resilient material covering and closely embracing said face plate; a rearwardly projecting peripheral portion on said cover adapted to contact and seal the portion of the wall that surrounds the wall box; said cover having a forwardly projecting hollow finger grip which is adapted to be located over the toggling operating member of a toggle switch which is disposed in the wall box and projects out through the open side of the switch box; said finger grip being adapted to be moved by pressure to actuate the switch operating member, and said cover having flexible means which is adapted to elongate without significant stretching of the material of which it is made when said finger grip is subjected to pressure and the switch operating member is actuated, said flexible means comprising a thin corrugated wall portion of said cover that is formed adjacent one side of said finger grip toward which said operating member is arranged to be toggled by a plurality of spaced parallel straight grooves which are formed in each side of said cover whereby said flexible means does not project beyond said cover and on elongation of said flexible means said thin corrugated wall portion acts as a cross section of a bellows and thereby permits such elongation without any significant stretching of said material.

10. The combination defined in claim 9 wherein said flexible means comprises a second thin corrugated wall portion similar to said thin corrugated wall portion which is disposed adjacent the opposite side of said finger grip.

11. A cover plate for the open side of an electrical toggle switch box comprising: a generally planar body of resilient material; a rearwardly projecting peripheral portion on said body adapted to contact the front wall of the switch box and seal it; a rigid planar reinforcing plate embedded in said body; an opening in said plate, said body having a projecting hollow finger grip on its front side which opens at its rear and is aligned with said opening whereby it is adapted to be located over the toggling operating member of a toggle switch which is disposed in the wall box; and flexible means in said body which is capable of elongation without significant stretching of the material of which said body is made, said flexible means comprising a thin corrugated wall portion of said body that is formed adjacent one side of said finger grip toward which said operating member is arranged to be toggled by a plurality of spaced parallel straight grooves which are formed in each side of said body whereby said flexible means does not project beyond said body and on elongation of said flexible means said thin corrugated wall portion acts as a cross section of a bellows and thereby permits such elongation without any significant stretching of said material.

12. The combination defined in claim 11 wherein said flexible means comprises a second thin corrugated wall portion similar to said thin corrugated wall portion which is disposed adjacent the opposite side of said finger grip.

References Cited in the file of this patent

UNITED STATES PATENTS

| | | |
|---|---|---|
| 1,237,501 | Goggin | Aug. 21, 1917 |
| 2,334,901 | Bullerjahn | Nov. 23, 1943 |
| 2,440,943 | Gonsett et al. | May 4, 1948 |
| 2,475,404 | Reed | July 5, 1949 |
| 2,787,398 | Smith | Apr. 2, 1957 |
| 2,795,144 | Morse | June 11, 1957 |
| 2,892,172 | McGann | June 23, 1959 |